United States Patent [19]

Berard

[11] 4,065,660
[45] Dec. 27, 1977

[54] ELECTRICAL APPLIANCE FOR HEATING FEEDING-BOTTLES AND LIKE CONTAINERS

[75] Inventor: Jean Claude Berard, Saint-Etienne, France

[73] Assignee: Seb S.A., Selongey, France

[21] Appl. No.: 665,569

[22] Filed: Mar. 10, 1976

[30] Foreign Application Priority Data

Apr. 4, 1975 France .............................. 75.10612
Dec. 12, 1975 France .............................. 75.38107

[51] Int. Cl.² ............................................ H05B 3/58
[52] U.S. Cl. .................................... 219/535; 219/386; 219/432; 219/433; 219/434; 219/436; 219/529; 219/545
[58] Field of Search ............... 219/211, 212, 385, 386, 219/387, 429, 432, 433, 434, 436, 437, 438, 439, 441, 442, 521, 528, 529, 535, 545; 126/261, 265; 222/131, 183; 21/102 R; 246/1.6; 294/33

[56] References Cited

U.S. PATENT DOCUMENTS

| | | | |
|---|---|---|---|
| 1,091,774 | 3/1914 | Shoenberg | 219/441 |
| 1,657,479 | 1/1928 | MacFarland | 219/545 X |
| 1,992,593 | 2/1935 | Whitney | 219/535 X |
| 2,090,666 | 8/1937 | Copeland | 219/521 X |
| 2,292,992 | 8/1942 | Crouch | 219/521 |
| 2,445,930 | 11/1946 | Arens | 219/528 |
| 2,470,694 | 8/1977 | Foo | 248/1.6 |
| 2,482,665 | 9/1949 | Geyer | 219/535 X |
| 2,500,241 | 8/1946 | Brown | 219/438 |
| 2,789,002 | 4/1957 | Nicholas | 294/33 |
| 2,931,884 | 4/1960 | Jepson et al. | 219/442 X |
| 3,025,384 | 3/1962 | Schwaneke | 219/442 |
| 3,210,199 | 10/1965 | Schlaf | 219/385 X |
| 3,231,716 | 1/1966 | Van Den Bosch | 219/433 |
| 3,296,415 | 1/1967 | Eisler | 219/385 |
| 3,374,338 | 3/1968 | Morey | 219/535 X |
| 3,514,579 | 5/1970 | Sanders | 219/430 |
| 3,984,656 | 10/1976 | Morgan | 219/439 |

FOREIGN PATENT DOCUMENTS

| | | | |
|---|---|---|---|
| 1,172,305 | 10/1958 | France | 219/212 |
| 1,548,800 | 10/1968 | France | 219/545 |
| 2,011,636 | 3/1970 | France | 219/528 |
| 2,105,517 | 4/1972 | France | 219/432 |
| 994,293 | 8/1951 | France | 219/535 |
| 1,946,753 | 3/1971 | Germany | 219/550 |
| 279,883 | 4/1952 | Switzerland | 219/211 |
| 894,815 | 4/1962 | United Kingdom | 219/535 |

Primary Examiner—Volodymyr Y. Mayewsky
Attorney, Agent, or Firm—Young & Thompson

[57] ABSTRACT

An electrical appliance for heating feeding-bottles, baby-food pots and containers of a similar type comprises a support and a heating element which is intended to come into contact with the container. The appliance further comprises a relatively flexible heating quilt which is fixed along a support handle, the quilt being intended to be wound and detachably fastened around the feeding-bottle or container to be heated.

3 Claims, 19 Drawing Figures

ELECTRICAL APPLIANCE FOR HEATING FEEDING-BOTTLES AND LIKE CONTAINERS

This invention relates to an electrical appliance for heating — and preferably continuously heating in order to maintain a constant temperature — food containers, including feeding-bottles and othe tubular containers such as baby-food jars or bottles in general. Thus the appliance can be employed for bringing wine to room temperature. For the sake of simplicity, reference will be made in the following description to the heating of feeding-bottles which corresponds to the preferred field of application of the invention.

Known appliances of this type which are usually known as feeding-bottle heaters comprise in the majority of instances a heating base fitted with a cup which is intended to contain water and also to accommodate the feeding-bottle to be heated. Heating of the feeding-bottle is thus carried out on the water-bath principle.

These appliances offer an advantage in that they can be adapted to the different dimensions of feeding-bottles and other containers without any modifications but suffer from the major drawbacks which are inherent in the use of water as a heat-transfer agent.

In fact, water evaporates progressively as the appliance is being used, with the result that deposits consisting of carbonate of lime are formed in the cup of the base and are difficult to remove. The presence of the water also results in detachment of labels. Furthermore, it is dangerous to displace these appliance during service since they contain very hot water.

Moreover, when the feeding-bottle is removed from the heating base, it is wetted by the hot water, which produces an unpleasant burning sensation when held by reason of the excellent thermal conductivity of water.

It should also be noted that, for reasons of rapidity of heating, the temperature of the water is set at a value which is distinctly higher than that which is necessary for the contents of the feeding-bottle. Thus, if the feeding-bottle remains in the water-bath for an excessive period of time, the temperature of the contents may in an extreme case attain that of the water, thereby increasing the potential danger of burning at the time of handling and of consumption.

In another type of feeding-bottle heater which is also known, provision is made for a cylindrical sleeve and a heating fabric element which is fixed within said sleeve and intended to come into contact with the feeding-bottle to be heated.

The disadvantage of this device lies essentially in the fact that it does not make it possible to adapt the internal diameter of the outer sleeve to the diameter of the feeding-bottle to be heated. Moreover, withdrawal and positioning of the feeding-bottle within an appliance of this type are not easily performed in practice.

The main object of the invention is to overcome the disadvantages mentioned above by providing an appliance which is both more convenient to use and to transport than feeding-bottle heaters of known types.

A further object of the invention is to provide an appliance in which the thermal regulation automatically takes into account both the variations in voltage of the mains supply, the quantity and the nature of the product to be heated and the type of container (feeding-bottle or the like of either glass or plastic material).

In accordance with the invention, the electrical appliance for heating feeding-bottles as well as other types of bottles, baby-food jars, other jars and the like, comprising a support and a heating element which is intended to come into contact with the feeding-bottle or like container to be heated essentially comprises a relatively flexible heating quilt which is fixed along a supporting handle, said heating quilt being intended to be wound and detachably fastened around the feeding-bottle or like container to be heated.

Since the heating quilt is intended to be wound directly around the feeding-bottle to be heated, the conditions of heat transfer are considerably improved and the disadvantages attached to the use of water as a heat-transfer agent are accordingly removed.

The expression "relatively flexible" is understood to mean that the quilt must neither be too flexible in order to prevent vertical collapse of this latter when the appliance is not being used nor too rigid in order to ensure that the quilt can be readily wound around the feeding-bottle to be heated. Preferably, the quilt structure will be such as to permit of residual deformation which can be modified according to the user's requirements.

In accordance with another preferable feature, the feeding-bottle is placed in such a manner as to ensure that its axis is located in a vertical plane and in particular that said axis is vertical.

In a preferred embodiment of the invention, the supporting handle of the heating quilt is fixed on a base which is intended to receive the feeding-bottle to be heated, the heating quilt being detachably fastened to the handle.

A base of this type maintains the appliance in the vertical position while it is being used whilst the handle serves to fix the heating quilt in position and makes it possible to move the appliance with ease even during use.

In an advantageous embodiment of the invention, the heating quilt is covered with a tubular piece of woven fabric, the two open ends of said piece of fabric being each closed by an edge member of plastic material molded around each end and the quilt being attached to the support in a vertical plane by means of said edge members.

The two molded edge members of plastic material prevent fraying of the cut ends of the tubular piece of fabric, endow the ends of the heating quilt with sufficient rigidity to prevent vertical collapse of the quilt and facilitate the attachment of this latter to the support.

In a preferred embodiment, the two edge members are engaged in two parallel slots in spaced relation which extend vertically in the support, at least one of the edge members being removably fastened within the corresponding slot.

Said slots serve to maintain the ends of the heating quilt in parallel relation and consequently ensure perfectly defined positioning of the quilt in the support in a vertical plane.

The means for removable fastening of the edge member of the quilt preferably comprise means for adjusting the engagement of the edge member within the corresponding slot of the support, said means being intended to permit modification of the internal diameter of the quilt which is attached to the support.

An arrangement as described facilitates the introduction of the feeding-bottle, of the food jar or like containers to be heated within the quilt or the withdrawal of this latter when heating is stopped. Said arrangement also makes it possible to adapt the internal diameter of the quilt to that of the feeding-bottle, the food jar or like containers to be heated.

Further particular features and advantages of the present invention will become apparent from the description given hereinafter, reference being made to the accompanying drawings which are given by way of example and not in any limiting sense, and in which.

Figure 1:
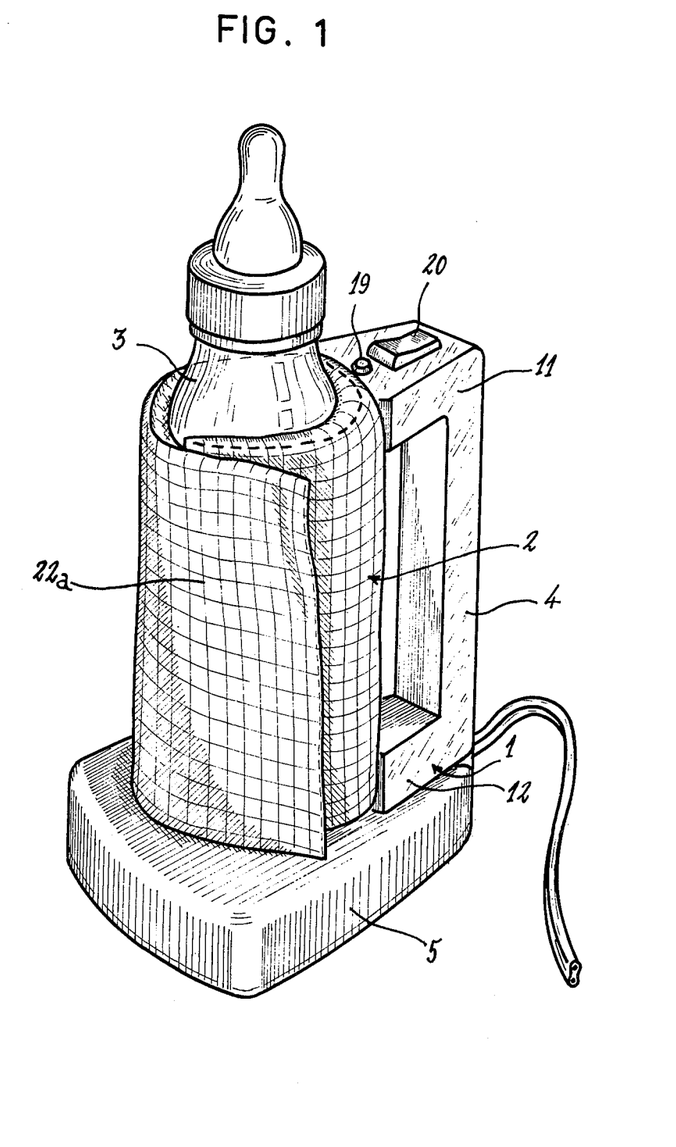
FIG. 1 is a perspective view of a feeding-bottle heater in accordance with the invention and during operation of the heater.
Figure 3:
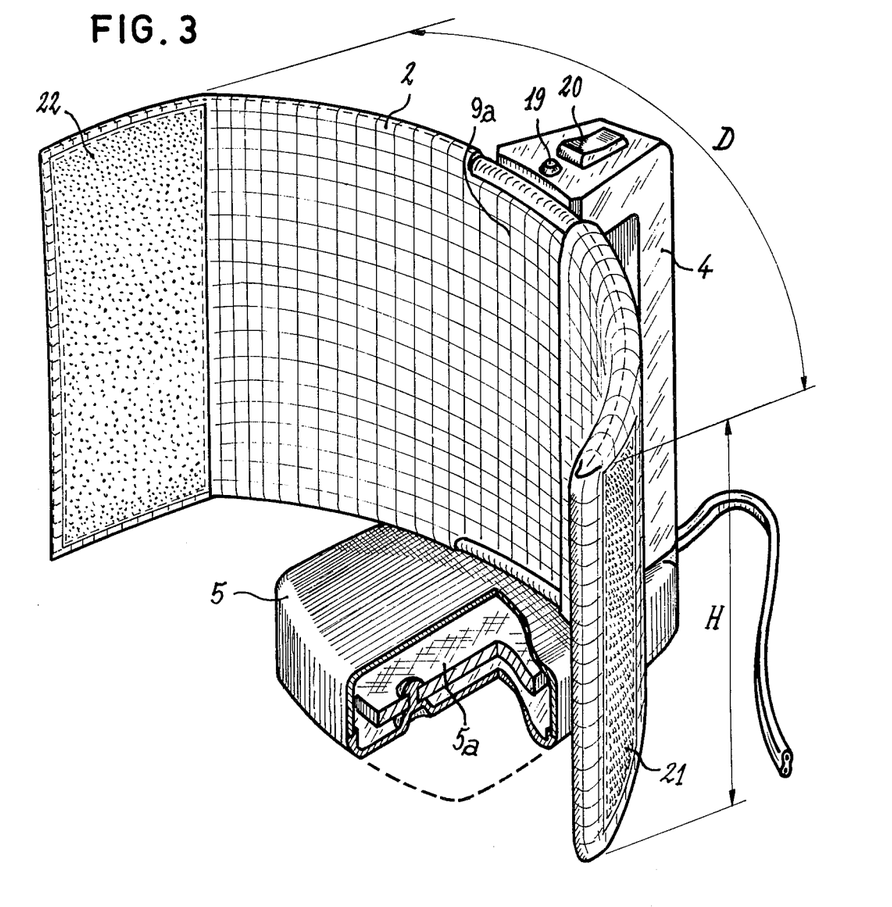
FIG. 3 is a cutaway view in perspective showing the feeding-bottle heater of FIG. 1, the appliance being in the inoperative state.

In the embodiments of FIGS. 1 and 3, the appliance for heating feeding-bottles and like containers, hereinafter designated as a feeding-bottle heater, comprises a support 1 along which is fixed a heating quilt 2 which is intended to be wound and fastened directly around the feeding-bottle 3 as indicated in FIG. 1.

In the example of FIGS. 1 and 3, the support 1 which is preferably of thermoplastic material comprises a handle 4 fixed on a base 5 on which the feeding-bottle 3 is intended to be placed. It is apparent that the handle 4 as well as the base 5 are of hollow construction. The base 5 contains a metallic plate 5a for providing the feeding-bottle heater with good stability and also contains certain elements of the electric regulating circuit which will be described in detail hereinafter.

Figure 2:
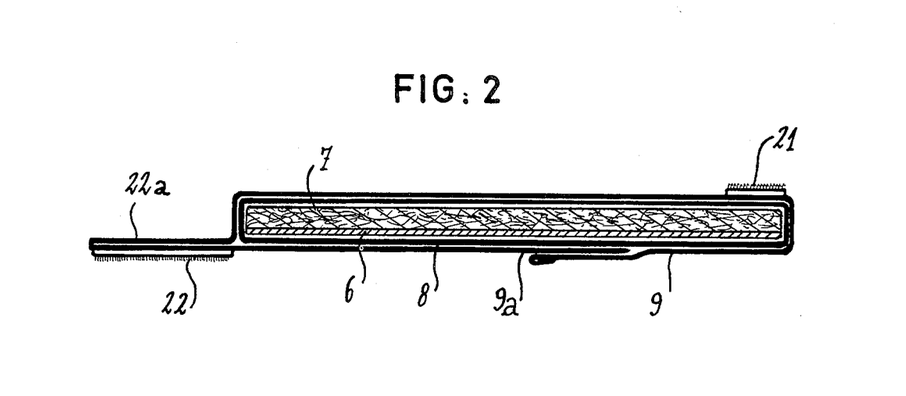
FIG. 2 is a sectional view of the heating quilt of the feeding-bottle heater shown in FIG. 1.

FIG. 2 shows that the heating quilt 2 comprises two internal layers 6 and 7. The internal layer 6 which constitutes the heating element is of flexible material to which the heating resistors are attached. The internal layer 7 which covers that face of the heating element 6 which is remote from the face to be placed in contact with the feeding-bottle 3 is constituted by heat-insulating material such as glass wool or any other suitable mineral fiber. These two internal layers 6 and 7 are surrounded by an envelope 8 of heat-resistant fabric.

In the example shown, a removable protective cover 9 of washable and decorative fabric is placed over said envelope 8. There is formed at each end of the protective cover a pocket in which are engaged the free ends of the quilt, said cover being passed within the handle 4. A flap 9a conceals the quilt 2 opposite to the handle 4 on the inside of the quilt 2.

Figure 4:
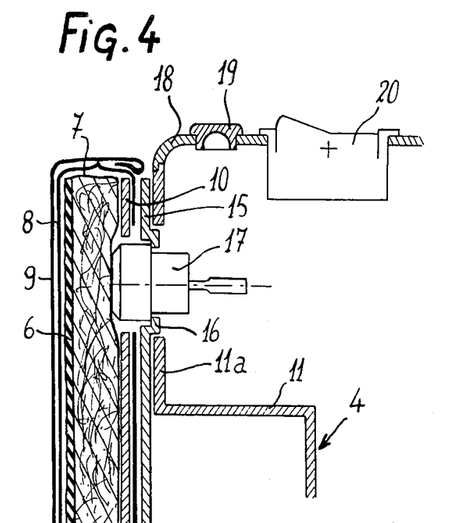
FIG. 4 is a transverse sectional view of the top portion of the feeding-bottle heater shown in FIG. 3.
Figure 5:
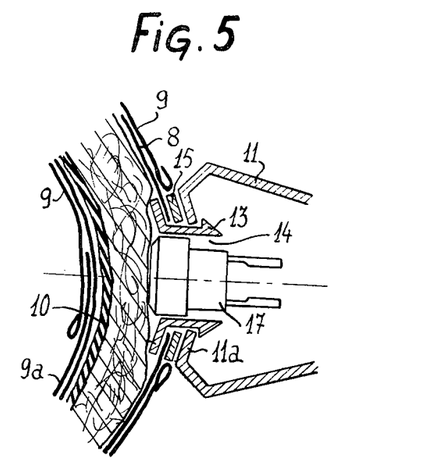
FIG. 5 is a horizontal sectional view of said top portion of the feeding-bottle heater shown in FIG. 3.

In the embodiments shown in FIGS. 4 and 5, it is apparent that the heating quilt 2 is attached to the handle 4 by means of a plate 10 located between the isothermal layer 7 and the envelope 8. Said plate 10 is provided opposite to each support bracket 11 and 12 of the handle 4 with claws 13 which are intended to engage behind the front face 11a of each support bracket 11 and 12. There is formed between the claws 13 a circular opening 14 located opposite to the opening formed in the walls 11a of the support brackets 11 and 12. The envelope 8 is also pierced opposite to said opening 14. Between the envelope 8 and the handle 4 is interposed a second plate 15 provided with catches 16 which serve to ensure centering in the support brackets of the handle.

In order to attach the quilt 2 to the handle 4, it is consequently only necessary to apply a force to the plate 10 in order to ensure that the claws 13 penetrate into the openings formed in the front wall of the support brackets 11 and 12.

Provision is made in the opening 14 of the internal plate 10 and only in the top support bracket 11 of the handle 4 for a thermostat 17 which is clamped between the catches 16 and applied against the isothermal layer 7. In the bottom support bracket 12, the opening 14 provides a passageway for the leads which connect the heating quilt 2 to the regulating elements.

The top portion of the support bracket 11 is closed by a plate 18 in which is fitted an indicator lamp 19 and a switch 20, the functions of which will be explained later.

It is also shown in FIGS. 2 and 3 that the free end portions of the heating quilt have bands 21 and 22 of material which is self-adhesive on the principle of mechanical hooking, of the type which is known by the trade name "Velcro".

One of the bands 22 consists of velvet and is sewn onto the internal face of a band of fabric 22a which forms an extension of one side of the protective cover 9. The other band 21 which is provided with micro-hooks is sewn directly onto the external face of the protective cover 9. In this manner, by choosing a length of heating quilt corresponding to the circumference of the smallest pot, the edges of the quilt cannot overlap in any event and the protective cover 9 can always be fastened over the largest pots.

The internal layer 6 which constitutes the heating element can be formed in various ways. Said layer can consist of heat-resistant fabric on which is sewn or bonded a bare or insulated resistance wire which is either straight or wound around a textile core. Heating blankets are usually manufactured in accordance with one of these methods. However, the amount of labor involved in the preparation of an element of this type makes this technique a very costly one.

Figure 6:
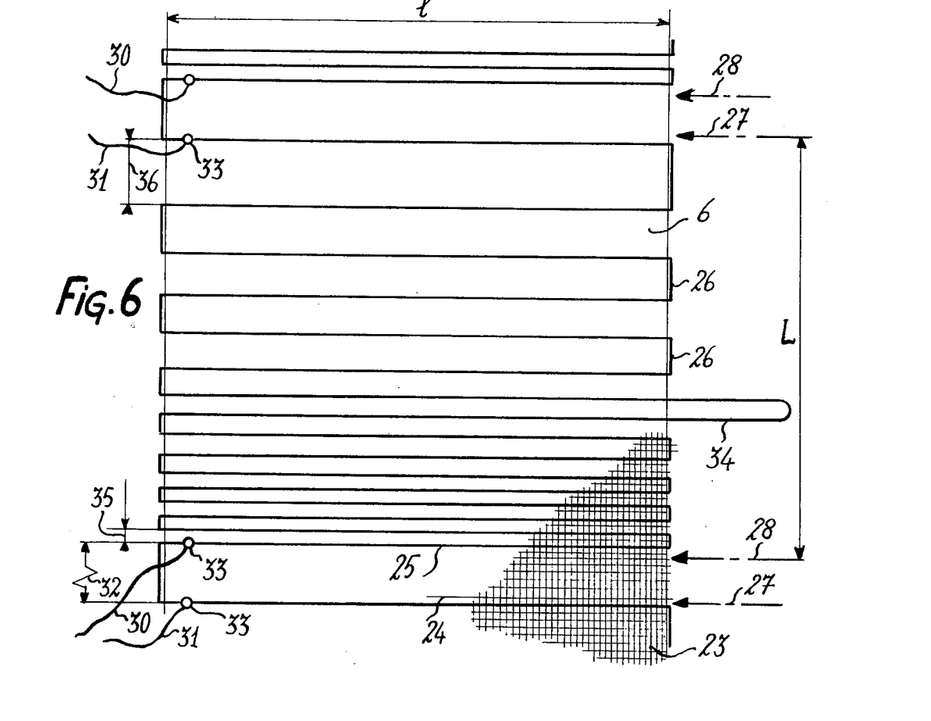
FIG. 6 is a partial diagrammatic view of a heating element of the quilt of the appliance in accordance with the invention.

As shown in FIG. 6, the heating element 6 is preferably constituted by a woven fabric element in which the warp is composed of insulating thread 23 (glass fiber, for example) and in which the weft is partly composed of threads 24 having the same texture as those of the warp and partly composed of conductive wires 25 having a resistivity such that the complete array of wires produces an ohmic value which is compatible with the power required for heating foods. The weft threads 24 and 25 are woven with two shuttles, those portions of threads 26 which form looped ends along the edge of the fabric being left uncut. This makes it possible to have a conducting wire 25 in a single length. By cutting the band of woven threads thus formed in the zones 27 and 28, there are thus obtained heating elements having a length L which is inscribed within the height H of the quilt, the width $l$ of the woven fabric being such as to correspond to the developed length D of said quilt 2. When the quilt 2 is wound around the feeding-bottle, the electric resistance wires 26 are thus disposed in planes at right angles to the vertical axis of the feeding-bottle. Experience has shown that this arrangement made it possible to improve heat exchanges between the quilt 2 and the feeding-bottle.

The end connections 30 and 31 can be obtained by allowing the resistance wire 25 to remain free along the edge of the fabric during the weaving of a band of fabric having a length 32, then by cutting said free wire so as to form two equal lengths. The connections can also be formed by extending the resistance wire 25 to a distance from the edge of the fabric as shown by the loop 34. Another method of forming the connections consists in rivetting a flexible wire to the resistance wire by means of rivets 33.

For reasons which will become apparent later, an intermediate connection 34 is left in readiness as a loop during the weaving of each element.

Although it is possible to weave an insulated resistance wire, it proves easier to employ a bare wire since the flexibility of this latter is closer to that of a textile yarn. By reason of the fact that the heating element 6 is placed between two insulating materials, namely the envelope 8 and the isothermal layer 7, the resistance conductor 25 does not need to have its own insulation. However, it may prove useful in order to reinforce this insulation to provide an insulating material between said heating element 6 and said envelope 8. This material may be provided in the form of a sheet (Bakelite paperboard, plastic material and the like) or in the form of a fabric element. In the case just mentioned, one advantageous solution consists in weaving the fabric element at the ame time as the heating elment in accordance with methods which are already known in the textile industry.

It is also shown in FIG. 6 that the resistance wire 25 extends over the entire width of its textile support and that the distance between the turns formed by the resistance wire 25 increases along L. Thus in the bottom portion of the heating element 6, the distance 35 between the first two turns is greater than the distance 36 between the last two turns.

This arrangement results in higher heating power in the lower portion of the element than in the upper portion and consequently in more powerful heating in the lower portion of the feeding-bottle 3.

Experience has shown that, during the heating process, this arrangement has the effect of inducing faster convection currents than in the case of uniform heatng, with the result that more rapid heating of the liquid contained in the feeding-bottle is obtained in the case of the invention for the same heating power.

Moreover, it is possible by means of this arrangement to prevent overheating of the upper portion of the feeding-bottle when this latter contains only a small quantity of liquid. This represents an appreciable advantage since overheating would be liable in particular to cause damage to the feeding-bottle when this latter is made of plastic material.

It should also be noted that, when the feeding-bottle contains a large quantity of liquid, uniform heating would give rise to temperature build-up of the thermostat 17 at an excessive rate and to cut-off of this latter before the desired temperature has been attained in the feeding-bottle.

The appliance described with reference to FIGS. 1 to 6 is also suitable for heating baby-food pots or jars. To this end, the appliance comprises means for modifying the heating power when the feeding-bottle is replaced by a food pot. These means can be constituted by a shunt (not shown in the drawings) which is connected between the lead 31 and the intermediate lead 34 of the heating fabric shown in FIG. 6. Putting of the shunt in or out of circuit can be controlled by the switch 20 of the appliance.

Figures 7, 8, 9:
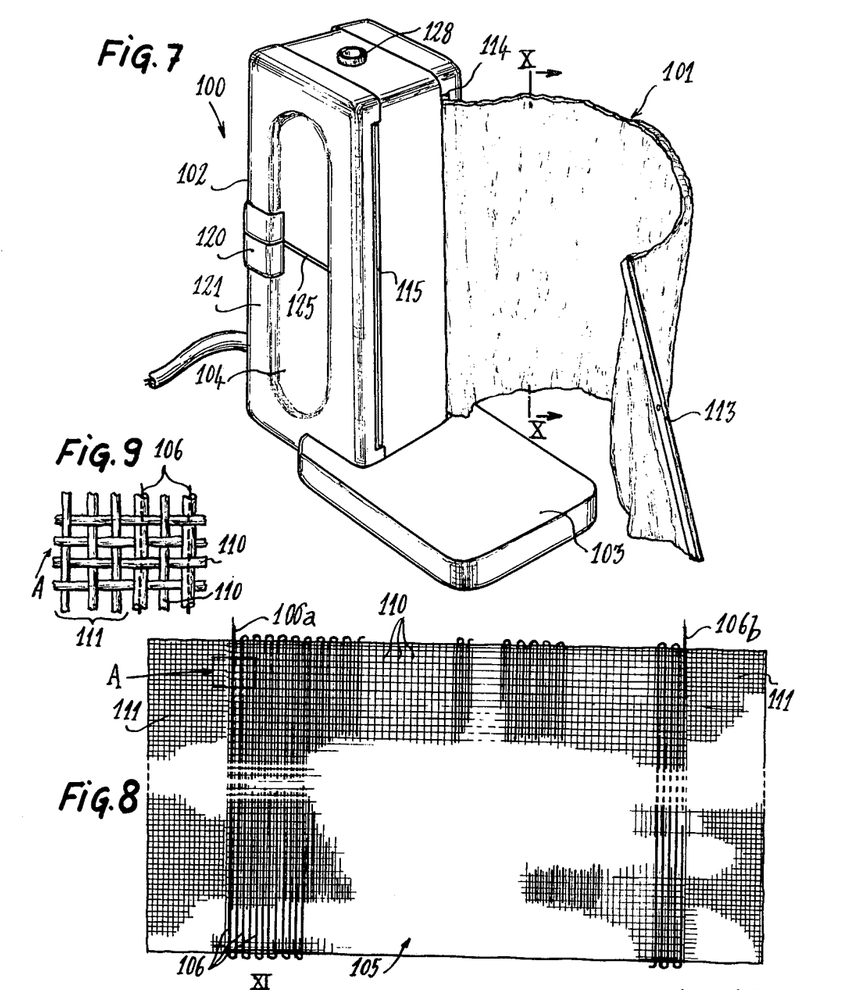
FIG. 7 is a perspective view of another feeding-bottle heater.
FIG. 8 is a plan view of the heating fabric element contained in the heating quilt of the feeding-bottle heater shown in FIG. 7.
FIG. 9 is a view to a larger scale showing the portion A of the heating fabric element of FIG. 8.

In the alternative embodiment shown in FIG. 7, the feeding-bottle heater comprises a support 100, there being attached to said support a heating quilt 101 which is intended to surround a feeding-bottle, a baby-food jar or a similar cylindrical container. The support 100 is provided with a handle 102 mounted on a base 103 which is intended to receive the base of a feeding-bottle or like container.

The handle 102 has the general shape of a right-angled parallelepiped and is provided on two of its opposite lateral faces with cavities 104 designed to afford an easier grip on the handle 102. Said handle and the base 103 are preferably formed of molded plastic material such as, for example, the acrylonitrile-butadiene-styrene polymer.

Figure 10:
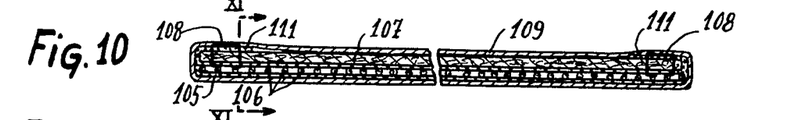
FIG. 10 is a sectional view along the height of the heating quilt of the feeding-bottle heater, this view being taken along line X—X of FIG. 7.

In the embodiment shown in FIGS. 8 to 11, the heating quilt 101 comprises a fabric element 105 of heat-resistance threads with which is incorporated an electric resistance wire 106. Said heating fabric element 105 is of rectagular shape and fixed on a layer of heat-insulating material 107 by means of clips 108 (as shown in FIG. 10) or the like. By way of example, the material which constitutes the heat-insulating layer 107 can consist of a felt fabric formed by non-woven synthetic fibers such as the material which is designated by the trade name "Kerlane." The complete assembly which is constituted by the heating fabric element 105 and the layer 107 of heat-insulating material is covered with a tubular piece 109 of woven fabric formed of synthetic threads which afford resistance to the operating temperature of the feeding-bottle heater such as, for example, a fabric having a base of aromatic polyamide marketed under the trade name "Nomex."

As shown in FIG. 8, the warp of the heating fabric element 105 is formed by a yarn 110 of insulating fibers consisting of glass fiber in this example. The weft is partly constituted by the glass fiber yarn 110 aforementioned and partly by the resistance wire 106. Thus the electric resistance wire 106 forms an integral part of the meshes of the heating fabric element 105 and extends within this latter in the form of spaced turns which are oriented in the direction of the weft of the fabric element 105. In the embodiment which is illustrated (see FIG. 9), the distribution of the resistance wire 106 is such that the weft of the heating fabric element 105 is constituted by an alternate arrangement of insulating threads 110 and resistance wires 106.

It is also apparent from FIG. 9 that the resistance wire 106 is sheathed in heat-resistant plastic material preferably constituted by a copolymer of tetrafluoro-ethylene-hexafluoropropylene (FEP). This material possesses both flexibility, resistance to the heating temperature and imperviousness to moisture.

It is further apparent from FIGS. 8 and 9 that the heating fabric element 105 is provided on two of its opposite edges with a band 111 which is parallel to the weft of the fabric, each band 111 being woven solely with the glass fiber thread 110. These woven bands 111 have the effect of locking the electric resistance wires 106a and 106b which are located at the point of junction between the heating fabric element 105 and the woven band 111. Said resistance wires 106a and 106b intended to be connected to the electric supply of the feeding-bottle heater.

The heating fabric element 105 is preferably manufactured in the form of a continuously woven band comprising a succession of zones in which the resistance wire 106 is woven in the direction of the weft on each side of which are located zones woven solely with the insulating thread 110. In order to obtain the heating fabric element 105, it is only necessary to cut the continuous band in the direction parallel to the weft in the zones which are woven solely with the insulating thread 110.

Moreover, as can be seen from FIG. 10, the bands 111 of the fabric element 105 are folded-back around the ends of the layer 107 of heat-insulating material and are fastened to said layer by means of the clips 108.

The structure of the heating quilt 101 and the choice of the constituent materials of this latter are such that said quilt is strictly insensitive to moisture and to overflowing of milk which would otherwise be liable to cause short-circuits between the turns of the resistance wire 106.

The structure of the heating quilt 101 and the choice of materials constituting this latter are also such as to ensure that said quilt is sufficiently flexible to admit of its being readily wound around the feeding-bottle or the food jar to be heated while being sufficiently rigid to prevent vertical collapse of the quilt.

Figure 11:
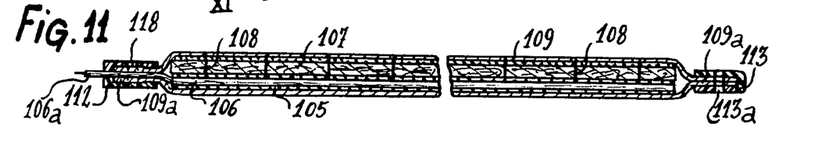
FIG. 11 is a sectional view along the length of the heating quilt of the feeding-bottle heater, this view being taken along line XI—XI of FIG. 10.

FIG. 11 shows that the open ends 109a of the tubular piece 109 of woven fabric which covers the assembly consisting of the insulating layer 107 and the heating fabric element 105 are closed by means of edge elements 112 and 113 of plastic material each constituted by two components bonded around the end portions 109a aforementioned by the ultrasonic welding technique, for example. The edge members 112 and 113 aforesaid extend vertically along the quilt 101 and prevent fraying of the cut ends of the tubular piece 109 of woven fabric. Moreover, said edge members 112 and 113 play an important part in the attachment of the heating quilt 101 to the handle 102 as will be explained hereinafter.

In the embodiment shown in FIG. 7, the handle 102 is provided on that face which is intended to be located opposite to the feeding-bottle or the food pot to be heated with two parallel slots 114 and 115 in spaced relation which extend vertically in the handle 102.

Each slot 114 and 115 is intended to receive one end of the quilt 101 on which is fitted the edge member 112 or 113. The edge member 112 which is engaged in the slot 114 as shown in FIG. 7 is permanently secured to the handle 102. On the other hand, the edge member 113 is intended to be removably fixed within the slot 115.

Figure 12:
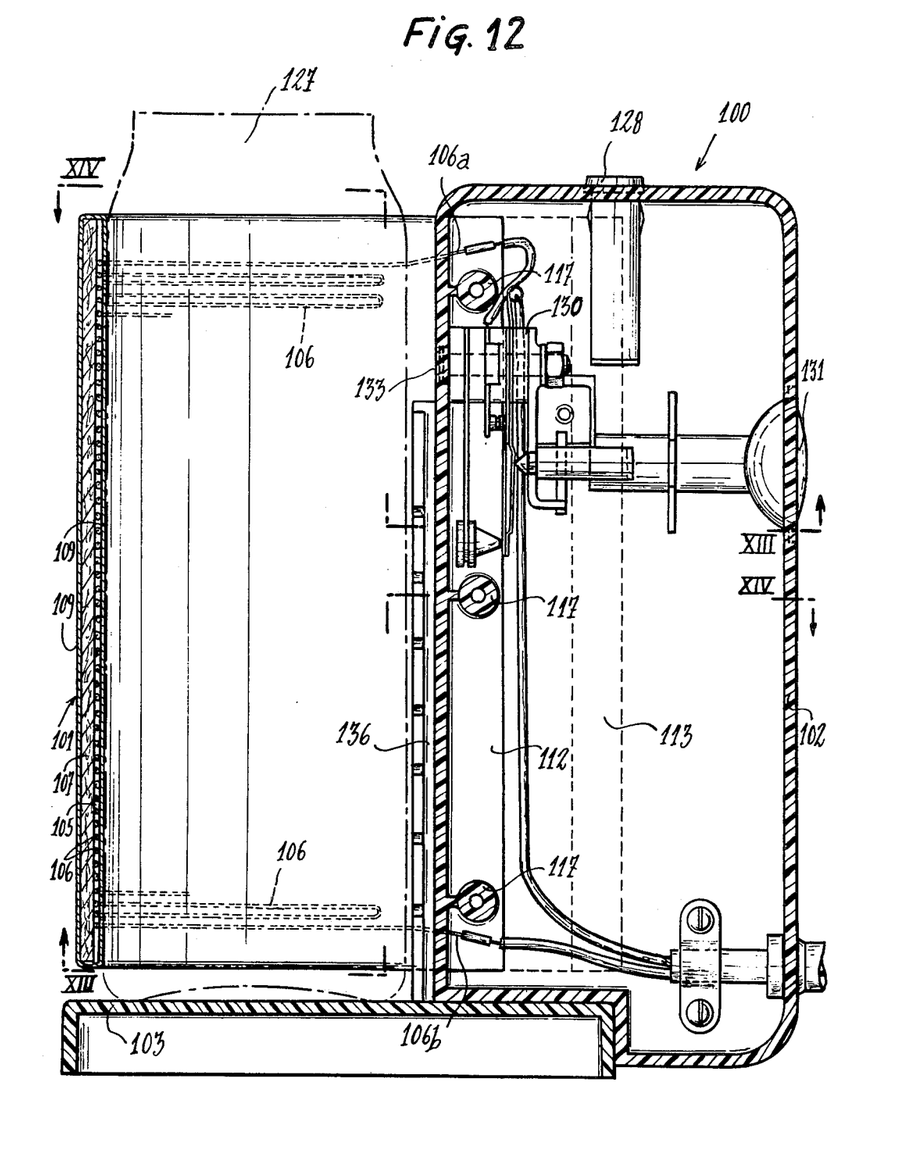
FIG. 12 is a longitudinal sectional view of the feeding-bottle heater shown in FIG. 7.
Figure 13:
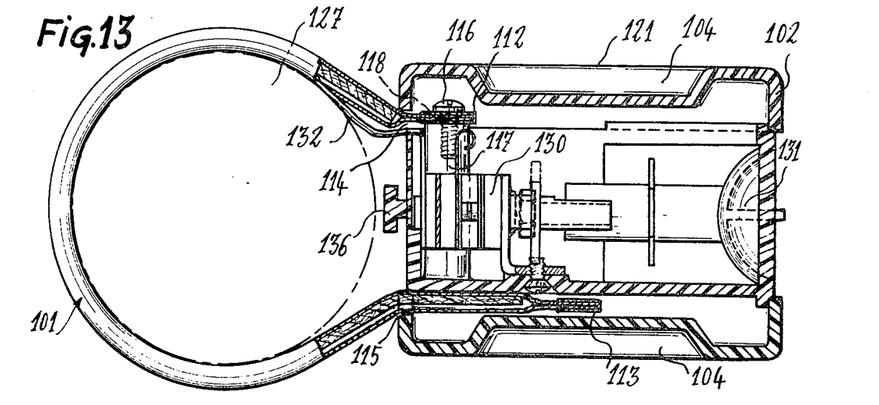
FIG. 13 is a transverse sectional view taken along line XIII—XIII of FIG. 12.
Figures 14, 15:
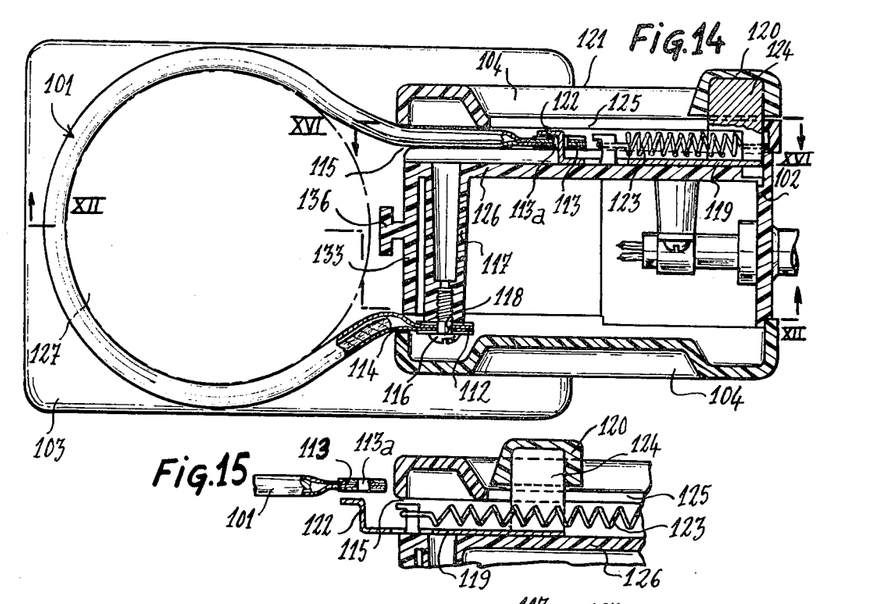
FIG. 14 is a transverse sectional view taken along line XIV—XIV of FIG. 12.
FIG. 15 is a part-sectional view which is similar to FIG. 14, the heating quilt being withdrawn from the support of the feeding-bottle heater.

In the embodiments shown in FIGS. 12, 13 and 14, permanent attachment of the edge member 112 which is engaged within the slot 114 of the handle 102 is ensured by means of screws 116 fixed in clamping-blocks 117 which are molded in the body of the handle 102, said screws 116 being engaged within holes 118 formed in the edge member 112 (as also shown in FIG. 11).

Figure 16:
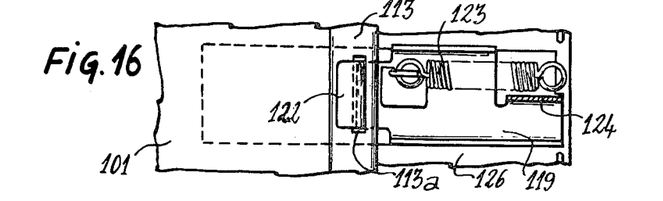
FIG. 16 is a part-sectional view taken along line XVI—XVI of FIG. 14.
Figure 17:
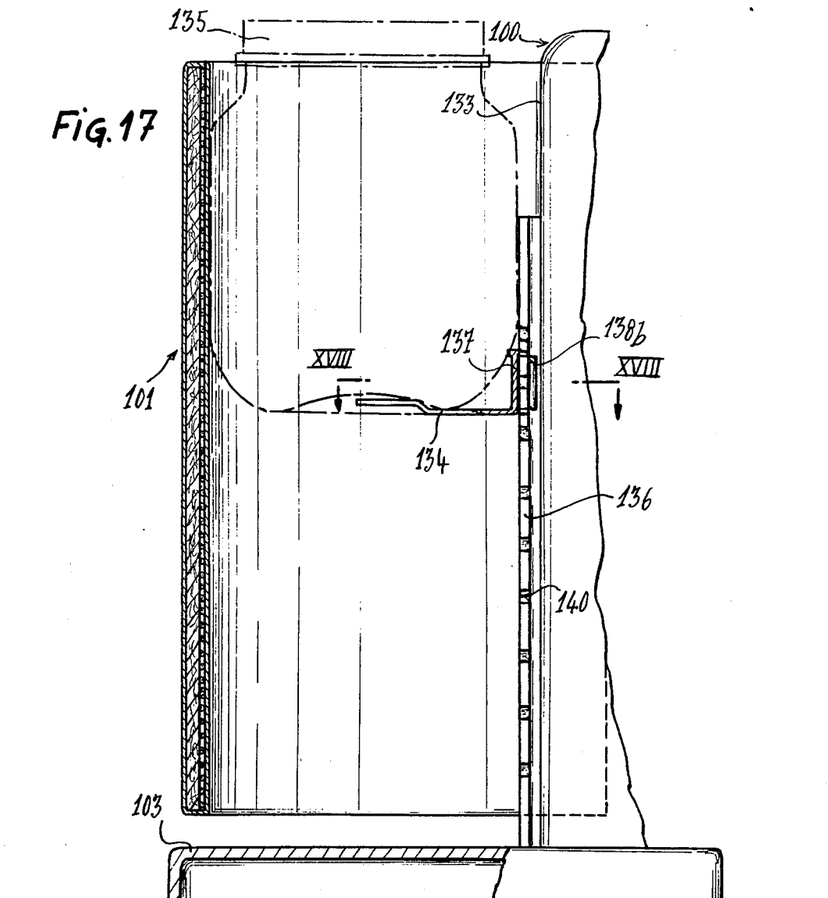
FIG. 17 is a fragmentary longitudinal sectional view of the support showing the arragement of a food jar within the interior of the heating quilt.

In the embodiments of FIGS. 14, 15 and 16, it is apparent that provision is made not only for the attachment of the edge member 113 within the slot 115 of the handle 102 in a removable manner but also for means whereby the extent of engagement of said edge member 113 within the slot 115 can be adjusted. This removable and adjustable system of attachment is carried into effect by means of a plate 119 mounted within the handle 102 and capable of translational motion within this latter under the action of a slide-button 120 which projects from the lateral face 121 (as also shown in FIG. 7). The plate 119 is provided at the end adjacent to the edge member 113 of the quilt with a hook 122 which is engaged in an opening 113a of the edge member 113. Moreover, said plate 119 is secured to a spring 123 which is attached to that wall of the handle 102 which is remote from the face 133, namely the face located opposite to the feeding-bottle 127. At the end remote from the hook 122, the plate 119 is provided with a lug 124 and this latter is engaged in a slot 125 which extends transversely through the cavity 104 of the lateral wall 121 at the mid-height of the handle 102 (see also FIG. 7).

Translational displacement of the plate 119 is guided on the one hand by said slot 125 and on the other hand by a partition-wall 126 which extends parallel to the face 121 of the handle 102 at a distance from said face 121 which corresponds to the width of the slot 115. The range of travel of the slide-button 120 within the cavity 104 of the handle 102 is limited by the opposite ends of the slot 125.

The restoring force of the spring 123 tends to return the slide-button 120 to the inactive position shown in FIG. 14. In this position, the quilt 101 which is wound around the feeding-bottle 127 is resiliently applied against the external surface of this latter. This arrangement is of a nature to promote heat exchanges between the heating guilt 101 and the feeding-bottle 127.

In order to remove the feeding-bottle from its support, it is only necessary to actuate the slide-button 120 by hand so as to displace this latter towards the left-hand side of FIG. 14 until the quilt is no longer applied against the feeding-bottle 127.

The edge member 113 of the quilt 101 can also be completely disengaged from the slot 115 of the handle 102. To this end, it is only necessary to displace the slide-button 120 completely towards the left-hand side of FIG. 14 to the end of travel, that is to say until the hook 122 projects outside the slot 115 and make it possible to detach the edge member 113 of the quilt 101 as shown in FIG. 15.

The means for removable attachment and the means for adjusting the engagement of the edge member 113 within the slot 115 as shown in FIGS. 14 to 16 also make it possible to adapt the internal diameter of the heating quilt 101 to that of cylindrical containers such as baby-food pots having larger diameters than that of the feeding-bottle 127.

In the embodiments of FIGS. 12 and 13, it is observed that the handle 102 contains a thermostat 130 which is connected to the outputs 106a and 106b of the electric resistance wire 106 of the heating quilt 101. Said thermostat 130 is adjustable by means of a control knob 131 which is rotatably mounted in the side wall of the handle 102 opposite to the side wall 133 which is adjacent to the feeding-bottle 127. Application of voltage to the heating quilt is visualized by the lighting-up of the indicator lamp 128 which is placed on the top face of the handle 102.

In the embodiment of FIG. 13, the temperature-sensing element of the thermostat 130 is placed in contact with the feeding-bottle 127 by means of a metallic strip 132, the curved profile of which bears against the body of the feeding-bottle 127 under the action of the restoring force of the spring 123.

Heating of the feeding-bottle 127 can be controlled with accuracy by virtue of the arrangement just described. In fact, since there is a direct contact between the feeding-bottle 127 and the thermostat 130, it is only necessary to adjust the release temperature of the thermostat 130 to the temperature which it is desired to obtain within the interior of the feeding-bottle 127.

Moreover, the curved profile of the metallic strip 132 can be adapted to containers having different diameters and in particular to the diameter of baby-food pots.

Figure 18:
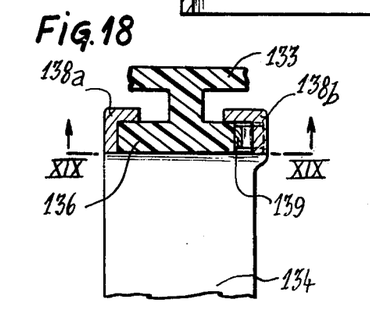
FIG. 18 is a sectional view taken along line XVIII—XVIII of FIG. 17.
Figure 19:
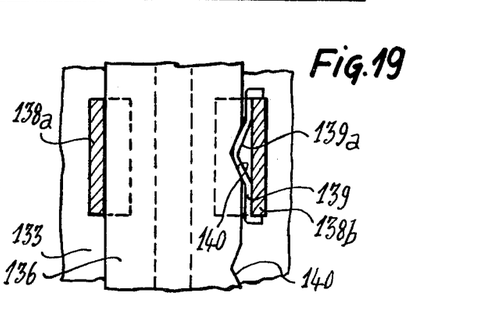
FIG. 19 is a sectional view taken along line XIX—XIX of FIG. 18.

In the embodiments shown in FIGS. 12, 13, 14 and 17, it is apparent that the handle 102 is provided on the face 133 which is adjacent to the heating quilt 101 with means for fixing a support plate 134 (see FIG. 17) which is intended to receive a food jar 135. Said means are constituted by a T-section support-bar 136 which extends along part of the height of the face 133 of the handle 102 from the base 103. Said support plate 134 has an L-shaped profile; the flange 137 of said plate 134 which is applied against the support-bar 136 is provided with two clamps 138a and 138b which surround the edges of the support-bar 136 (as shown in FIGS. 18 and 19). A spring 139 having a bent central portion 139a is mounted between the clamp 138b (FIG. 19) and the adjacent edge of the support-bar 136. Said bent central portion 139a cooperates with notches 140 formed in the adjacent edge of the T-section support-bar 136. By means of the spring 139, it is possible to adjust the position of the support plate 134 along the support-bar 136 as a function of the height of the food jar 135 or of the container to be heated.

It is readily apparent that the invention is not limited to the embodiments described in the foregoing but that certain changes may be made in the construction of the feeding-bottle heater without thereby affecting the operation of this latter.

It is thus possible to provide different means for the removable attachment and adjustment of the edge member 113 with respect to the handle 102 such as, for example, means which can be actuated by hand and serve to clamp said edge member 113 with respect to said handle 102.

Furthermore, the connection between the thermostat 130 and the container to be heated can also be provided by a probe located on the face 133 of the handle 102 and resiliently applied against the container to be heated by means of a spring.

In addition, the T-section support-bar 136 for positioning the support plate 134 can be replaced by a T-section groove formed in the face 133 of the handle 102 in cooperating relation with a T-section member having a complementary profile and rigidly fixed to the support plate 134.

I claim:

1. An electrical appliance for heating food containers, comprising a support having a base intended to receive the bottom of a container, said support having a handle, a relatively flexible heating quilt comprising an electric resistance wire and being secured to the handle, said resistance wire having two terminals intended to be connected with an electric supply, said heating quilt having two edge members and being foldable around the container placed on the base of said support and said heating quilt being secured to the handle by its two edge members, one of said edge members carrying means for fastening removably the heating quilt to the handle, wherein the two edge members are engaged in two parallel slots in spaced relation which extend vertically in the handle, said one edge member being removably engaged and fastened within the corresponding slot by means which comprise means for adjusting the engagement of the said one edge member within said corresponding slot.

2. An electrical appliance according to claim 1, wherein the removable fastening means and the means for adjusting the engagement of the edge member within the corresponding slot of the support comprise a plate mounted in the support and displaceable in translational motion under the action of a slide-button placed on an external face of said support, said plate being provided at one end thereof with a hook engaged in a hole formed in the edge member of the quilt, a restoring spring attached to said support being secured to said plate.

3. An electrical appliance according to claim 2, wherein the plate is provided with a lug engaged in a slot which extends along said face of the support and substantially at the mid-height of said support, the slide-button being fixed on said lug.

* * * * *